A. ELLIOTT.
Car-Coupling.

No. 204,013.              Patented May 21, 1878.

Witnesses:          Inventor:
Edw. W. Donn       Austin Elliott
L. M. Duncan       By Parker H. Sweet Jr. & Co.
                           atty's.

UNITED STATES PATENT OFFICE.

AUSTIN ELLIOTT, OF WARRENSBURG, MISSOURI.

IMPROVEMENT IN CAR-COUPLINGS.

Specification forming part of Letters Patent No. 204,013, dated May 21, 1878; application filed April 23, 1878.

*To all whom it may concern:*

Be it known that I, AUSTIN ELLIOTT, of Warrensburg, in the county of Johnson and State of Missouri, have invented certain new and useful Improvements in Car-Couplings; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
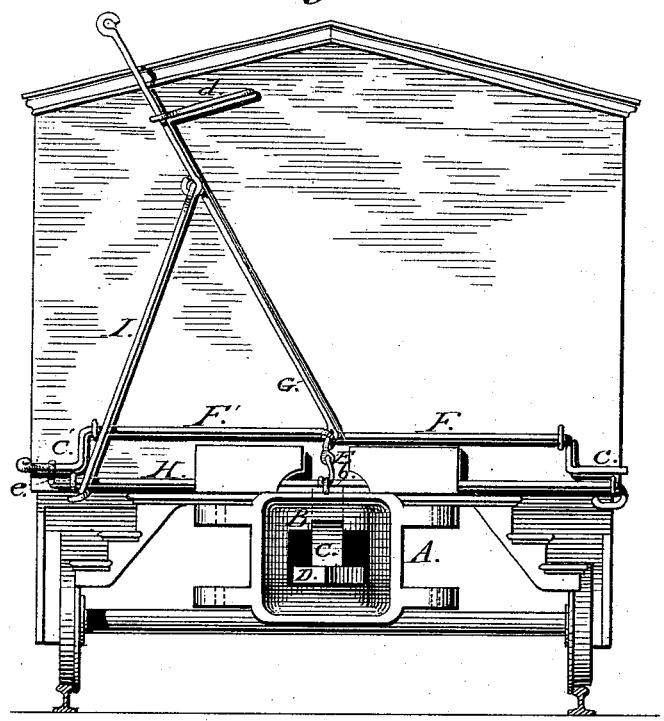
Figure 2:
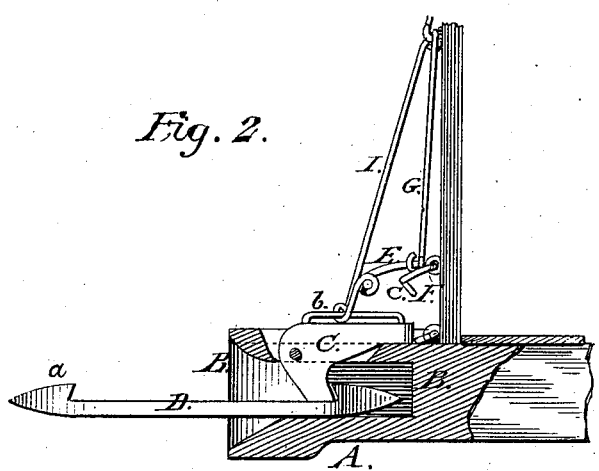

Figure 1 represents an end view of a freight-car embodying my invention; and Fig. 2, a detail side view, partly in section, of the same.

Similar letters of reference indicate like parts in both figures.

My invention has relation to automatic car-couplings; and it consists of a bumper provided with a pivoted dog, which locks the coupling-links in place automatically by a gravitating movement, and capable of being readily uncoupled at either side of the car or on top of the same, all as will be hereinafter more fully described, and pointed out in the claims.

Referring to the drawings, A represents the bumper or bull-head attached to the lower end of a freight-car, said bumper having an open flaring mouth, and a recess, B, of a wedge-shape at the rear, and provided with an open slot at the top for the reception of a pivoted dog or catch, C.

The coupling-link D is constructed of a flat bar of metal, having tapering or wedge-shaped ends, a, which project above the surface of the bar, so as to form a lug to catch under the downwardly-projecting end of the dog C.

The upper part of the dog C is provided with a staple, b, in which works the end of the arm E, standing at right angles from, and forming a part of, the horizontal bar F, attached to the lower end of the car, and provided with a crank, c, at the side of the same, as shown in Fig. 1.

Upon the opposite side of the end of the car is attached an auxiliary bar, F', also provided with a crank, c, at the side, which is attached to the arm E, the object of said bars being such that the cars can be uncoupled without passing between the same, but can be uncoupled from either side by raising the crank c, which, in turn, elevates the arm E and releases the clutch of the dog from the coupling-link D.

G represents a bar, attached at its lower end to the arm E, and passing upward through a staple, d, to the top of the car, the object of which is such that the cars can be as readily uncoupled from the top as from the sides.

A bar, H, is attached to the end of the car below the bar F', and is provided with an arm, e, to which is connected a rod, I, the upper end of which is attached to the vertical rod G, the object of which is to serve as a means of keeping the dog in a raised position to receive the coupling-link at any time. The arm e, catching under the crank c, holds it in an elevated position, which, in turn, holds the arm E up, and with it the dog.

The advantages of my invention will be readily apparent without a more minute description, inasmuch as it combines, in its construction and operation, simplicity and utility with a ready adaptation to the purpose contemplated.

Having thus described my invention, what I claim as new and useful is—

1. In a car-coupling, the bumper A', provided with the pivoted dog C, having staple b, in combination with the arm E, bars F F', having cranks c and bar G, provided with rod I attached to horizontal bar H', the several parts being adapted for operation in connection with each other, substantially as and for the purpose specified.

2. The pivoted dog C, provided with staple B, in combination with arm E, attached to bar F, said bar having a crank, c, to lift said dog, and rod H, provided with arm e, by which said dog is held up out of the way when it is not desirable to couple.

In testimony that I claim the foregoing as my own invention I affix my signature in presence of two witnesses.

AUSTIN ELLIOTT.

Witnesses:
 JAMES K. WARD,
 GEO. D. WEIDEMEYER.